(12) United States Patent
Hu

(10) Patent No.: US 12,188,994 B2
(45) Date of Patent: Jan. 7, 2025

(54) ELECTRONIC APPARATUS

(71) Applicant: QISDA CORPORATION, Taoyuan (TW)

(72) Inventor: Hsin-Yun Hu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 166 days.

(21) Appl. No.: 18/105,257

(22) Filed: Feb. 3, 2023

(65) Prior Publication Data
US 2023/0296696 A1 Sep. 21, 2023

(30) Foreign Application Priority Data

Mar. 18, 2022 (CN) .......................... 202210272150.2

(51) Int. Cl.
*G01R 31/70* (2020.01)
*G01R 31/54* (2020.01)
*H05K 1/02* (2006.01)

(52) U.S. Cl.
CPC ............. *G01R 31/70* (2020.01); *G01R 31/54* (2020.01); *H05K 1/0298* (2013.01)

(58) Field of Classification Search
CPC ...... G01R 31/70; G01R 31/54; H05K 1/0298; H05K 1/144; H05K 2201/10189; H05K 2201/1031; H05K 2201/10325; H05K 2201/10333; H05K 1/0275; H05K 7/12; H05K 7/14; G06F 21/86
See application file for complete search history.

(56) References Cited

U.S. PATENT DOCUMENTS

| | | | |
|---|---|---|---|
| 9,426,904 B2 | 8/2016 | Fitzsimmons et al. | |
| 2007/0224878 A1* | 9/2007 | Kao | H05K 3/365 439/496 |
| 2013/0163229 A1* | 6/2013 | Tsai | H04M 1/026 362/188 |
| 2013/0309882 A1* | 11/2013 | Lin | H01R 13/6591 439/86 |
| 2015/0234432 A1* | 8/2015 | Liao | G06F 1/1656 428/137 |
| 2019/0074113 A1* | 3/2019 | Lim | H01C 7/10 |

\* cited by examiner

*Primary Examiner* — Alvaro E Fortich

(57) ABSTRACT

An electronic apparatus includes a main circuit board, a seat body, a detachable element and a detection element. The seat body is disposed on the main circuit board and includes an opening and a conductive structure located in the opening. The detection element is disposed on the detachable element and includes an elastic conductive member. The elastic conductive member is adapted to extend into the opening, apply an elastic force to the seat body in the opening, and electrically contact the conductive structure. The main circuit board is adapted to determine that the seat body and the detection element are in a first state or a second state. The first state includes that the elastic conductive member electrically contacts the conductive structure. The second state includes that the elastic conductive member is separated from the conductive structure.

18 Claims, 3 Drawing Sheets

ELECTRONIC APPARATUS

FIELD OF THE INVENTION

The present invention relates to an electronic apparatus, and more particularly to an electronic apparatus capable of detecting whether it is disassembled without authorization.

BACKGROUND OF THE INVENTION

In order to prevent unauthorized disassembly or modification of today's electronic apparatus, most of the detachable components are designed with a protection mechanism against detaching. Fragile labels or stickers are more common in the aforementioned protection mechanism against detaching. However, such protection mechanism against detaching is easy to break for more experienced technicians. In addition, in some electronic apparatuses, the installation method of the detachable components is designed to be more complicated so as to increase the difficulty of disassembly, but it also increases the time for product assembly at the same time.

SUMMARY OF THE INVENTION

The present invention provides an electronic apparatus capable of detecting whether a detachable element is disassembled and also having the advantages of simple structure and easy assembly.

The electronic apparatus provided by the present invention includes a main circuit board, a seat body, a detachable element and a detection element. The seat body is disposed on the main circuit board and includes an opening and a conductive structure located in the opening. The detection element is disposed on the detachable element and includes an elastic conductive member. The elastic conductive member is adapted to extend into the opening, apply an elastic force to the seat body in the opening, and electrically contact the conductive structure. The main circuit board is adapted to determine that the seat body and the detection element are in a first state or a second state. The first state includes that the elastic conductive member electrically contacts the conductive structure. The second state includes that the elastic conductive member is separated from the conductive structure.

In an embodiment of the present invention, a number of the elastic conductive members of the detection element is two, and the two elastic conductive members are opposite to each other.

In an embodiment of the present invention, the two elastic conductive pieces each include a conductive elastic piece. The two conductive elastic pieces each have a convex portion. When the two conductive elastic pieces extend into the opening, the two convex portions are adapted to press against the seat body in the opening, and the convex portion is adapted to electrically contact the conductive structure.

In an embodiment of the present invention, the convex portion is formed by bending the conductive elastic piece, for example.

In an embodiment of the present invention, the detection element further has a body connected between the conductive elastic piece and the detachable element. The convex portion is located at an end of the conductive elastic piece away from the body.

In an embodiment of the present invention, the seat body has a side wall. The side wall surrounds the opening and has an inner wall surface. The inner wall surface is located in the opening, and the conductive structure is disposed on all or part of the inner wall surface.

In an embodiment of the present invention, a number of the elastic conductive members of the detection element is two, and the two elastic conductive members are opposite to each other. A number of the inner wall surfaces of the side wall is two, and the two inner wall surfaces are disposed to correspond to the two elastic conductive members. The conductive structure is disposed on the two inner wall surfaces.

In an embodiment of the present invention, the seat body has a base and a side wall. The side wall stands on the seat body and surrounds the opening. The base has a bottom surface located in the opening. The conductive structure is disposed on the bottom surface.

In an embodiment of the present invention, the seat body further has, for example, a side wall and a detection circuit layer. The side wall surrounds the opening, and the detection circuit layer is disposed in the side wall and surrounds the opening. The detection circuit layer is electrically connected to the main circuit board.

In an embodiment of the present invention, the side wall has an inner side and an outer side. The inner side is located in the opening and is opposite to the outer side, and the inner side and the outer side surround the opening. A number of the detection circuit layers is plural. The detection circuit layers are disposed between the inner side and the outer side and overlap the inner side and the outer side.

In an embodiment of the present invention, the detection circuit layer is electrically connected to the main circuit board via the conductive structure.

In an embodiment of the present invention, the side wall includes a printed circuit board, and a wiring layer of the printed circuit board is the detection circuit layer.

In an embodiment of the present invention, the printed circuit board includes a multi-layer circuit board. The number of the detection circuit layers is plural. Wiring layers of the multi-layer circuit board are the detection circuit layers.

In an embodiment of the present invention, the printed circuit board includes a plurality of single-layer circuit boards that overlap each other. The number of the detection circuit layers is plural. Wiring layers of the single-layer circuit boards are the detection circuit layers.

In an embodiment of the present invention, the two conductive structures each include a metal plating layer.

In an embodiment of the present invention, the detection element further includes a conductive layer disposed on the elastic conductive member. An electrical conductivity of the conductive layer is greater than an electrical conductivity of the elastic conductive member.

In an embodiment of the present invention, a material of the elastic conductive member includes copper alloy, and a material of the conductive layer includes gold.

In an embodiment of the present invention, the seat body is fixed on the main circuit board and is electrically connected to the main circuit board.

The electronic apparatus of the present invention adopts the detection element and the seat body, wherein a detachable element is disposed on the detection element. When assembling the electronic apparatus, the elastic conductive member is inserted into the opening of the seat body, and the elastic conductive member is electrically contacted with the conductive structure in the opening, so as to complete the installation of the detachable element. On the other hand, when the elastic conductive member is detached from the seat body, the main circuit board can determine that the detachable element is detached accordingly. Therefore, the electronic apparatus of the present invention can not only detect that the detachable element is detached, but also has the advantages of simple structure and easy assembly.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
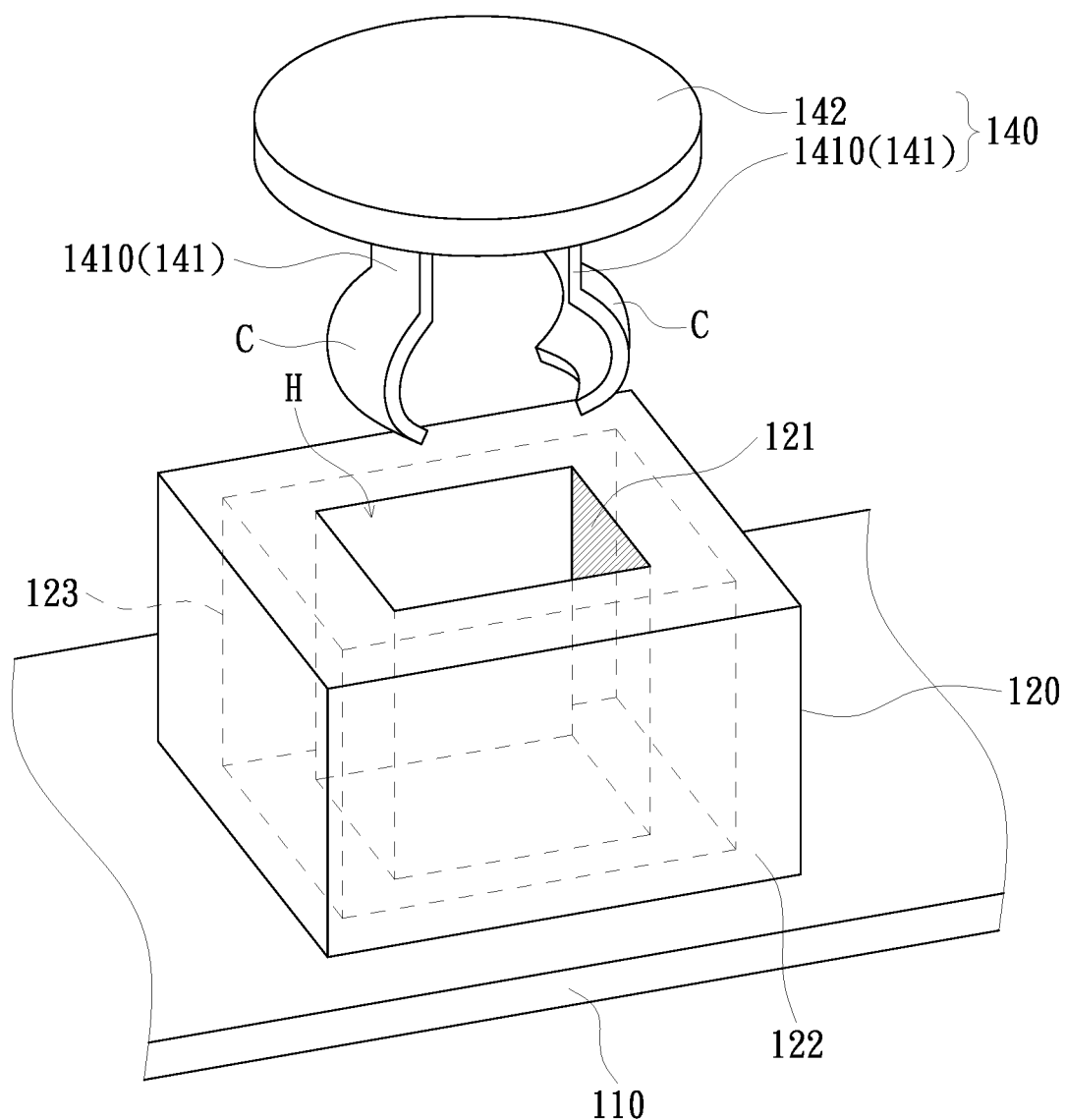
FIG. 1 is a schematic diagram of an electronic apparatus in which a detection element and a seat body are separated according to an embodiment of the present invention.
Figure 2:
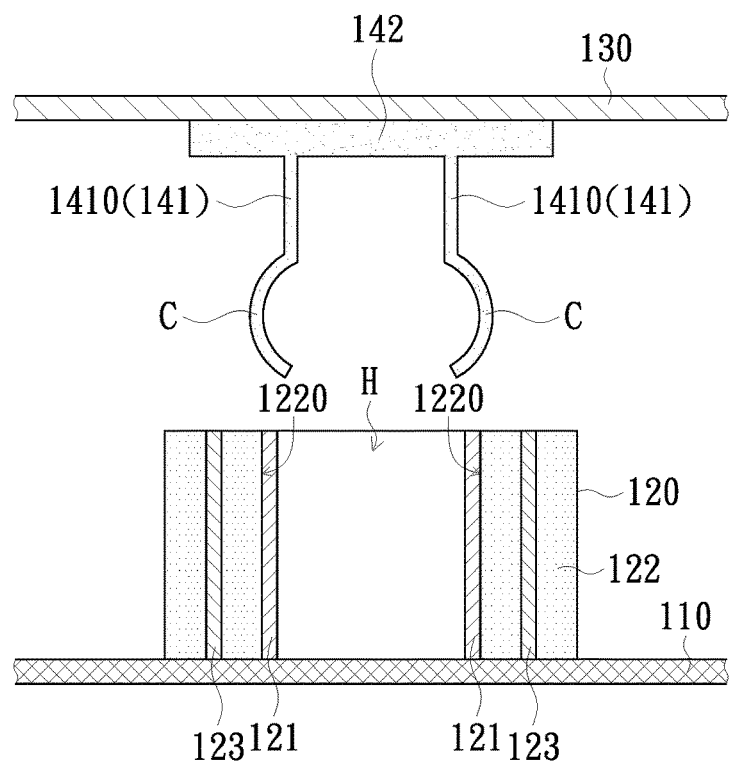
FIG. 2 is a schematic cross-sectional diagram of the electronic apparatus of FIG. 1 in a second state.
Figure 3:
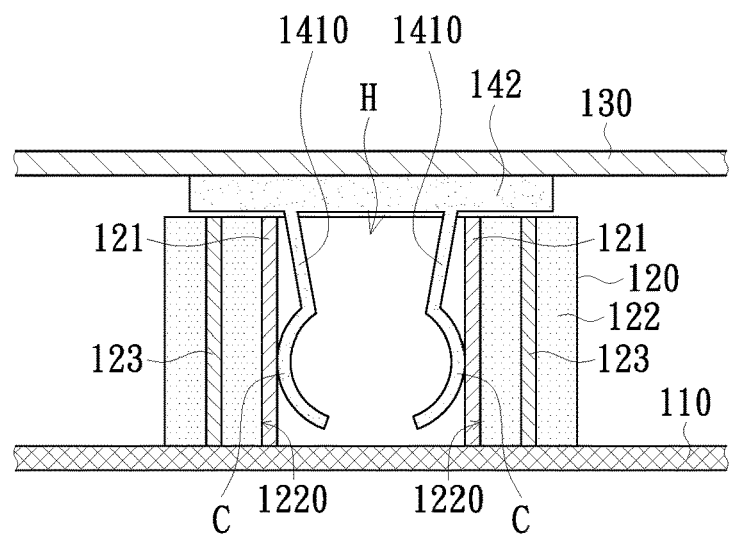
FIG. 3 is a schematic cross-sectional diagram of the electronic apparatus of FIG. 1 in a first state.

FIG. 1 is a schematic diagram of an electronic apparatus in which a detection element and a seat body are separated according to an embodiment of the present invention. FIG. 2 is a schematic cross-sectional diagram of the electronic apparatus of FIG. 1 in a second state. FIG. 3 is a schematic cross-sectional diagram of the electronic apparatus of FIG. 1 in a first state. Please refer to FIGS. 1 to 3. The electronic apparatus 100 includes a main circuit board 110, a seat body 120, a detachable element 130 (shown in FIGS. 2 and 3), and a detection element 140 (labeled in FIG. 1). In order to clearly present the seat body 120 and the detection element 140, the detachable element 130 is not shown in FIG. 1. The seat body 120 is disposed on the main circuit board 110. The seat body 120 includes an opening H and a conductive structure 121 located in the opening H. The detection element 140 is disposed on the detachable element 130. The detection element 140 includes an elastic conductive member 141. The elastic conductive member 141 is adapted to extend into the opening H and provide an elastic force on the seat body 120 in the opening H. In addition, the elastic conductive member 141 is adapted to electrically contact the conductive structure 121. The main circuit board 110 is adapted to determine whether the seat body 120 and the detection element 140 are in the first state or the second state. As shown in FIG. 3, the first state includes that the elastic conductive member 141 electrically contacts the conductive structure 121. As shown in FIG. 2, the second state includes that the elastic conductive member 141 is separated from the conductive structure 121.

In this embodiment, it should be noted that the second state includes, for example, that the elastic conductive member 141 is separated from the conductive structure 121 in an unauthorized situation. Specifically, the elastic conductive member 141 of the detection element 140 is driven to separate from the conductive structure 121 when the detachable element 130 is detached from the seat body 120, and then the main circuit board 110 can determine whether the elastic conductive member 141 is separated from the conductive structure 121 in an unauthorized situation. The aforementioned unauthorized situation may include that the electronic apparatus 100 is disassembled without following a specific procedure, or the electronic apparatus 100 is disassembled within the warranty period, but the present invention is not limited thereto. In one embodiment, the main circuit board 110 determines that the seat body 120 and the detection element 140 are in the second state regardless of whether the elastic conductive member 141 is separated from the conductive structure 121 in an unauthorized situation or in an authorized situation.

Please refer to FIGS. 1 to 3 together again. The electronic apparatus 100 of this embodiment may include a smart phone, a tablet computer or a notebook computer, and the detachable element 130 is exemplified by a touch panel, but other embodiments are not limited thereto. Specifically, in this embodiment, the detection element 140 may be disposed at the edge or corner of the aforementioned touch panel, and the number and size of the detection elements 140 may be determined according to the size of the touch panel, but the present invention does not limit these detailed features.

The main circuit board 110 is, for example, disposed inside the electronic apparatus 100 and can perform a corresponding action when it is determined that the elastic conductive member 141 is separated from the conductive structure 121 (i.e., the second state). For example, in one embodiment, the main circuit board 110 may be electrically or communicatively connected to a security detection unit (not shown) and transmit a warning signal to the security detection unit when it is determined that the seat body 120 and the detection element 140 are in the second state. The aforementioned security detection unit may include hardware installed in the electronic apparatus 100, software installed in the electronic apparatus 100, or an external device independent of the electronic apparatus 100, and the present invention is not limited thereto. In another embodiment, the main circuit board 110 may store the aforementioned warning signal in a memory (not shown) of the electronic apparatus 100 for future inquiries when it is determined that the seat body 120 and the detection element 140 are in the second state.

The elastic conductive member 141 of this embodiment may be coated with a conductive layer (not shown) to improve electrical conductivity. For example, the material of the elastic conductive member 141 may include copper alloy, and the material of the aforementioned conductive layer may include a material with higher electrical conductivity than the aforementioned copper alloy, such as gold, but the invention is not limited thereto. In this embodiment, the number of the elastic conductive members 141 of the detection element 140 is, for example, two, and the two elastic conductive members 141 are opposite to each other. The two elastic conductive members 141 each may include a conductive elastic piece 1410. The two conductive elastic pieces 1410 each have a convex portion C. When the two conductive elastic pieces 1410 extend into the opening H, the two convex portions C are adapted to press against the seat body 120 in the opening H and electrically contact the conductive structure 121. Specifically, the convex portions C electrically and physically contact the conductive structure 121. In this embodiment, the aforementioned elastic force applied by the elastic conductive member 141 on the seat body 120 is, for example, the force of the convex portion C pushing against the seat body 120, so that the detection element 140 can be more firmly fixed in the seat body 120. It should be noted that the force of the two convex portions C pressing against the seat body 120 can be adjusted by changing the diameter of the opening H or the distance between the two conductive elastic pieces 1410, therefore, the electronic apparatus 100 of this embodiment also prevents the two conductive elastic pieces 1410 from pushing against the seat body 120 with too much force, thereby increasing the service life of the detection element 140 and the seat body 120. In this embodiment, the convex portion C is formed, for example, by bending the conductive elastic piece 1410 to save material and reduce cost. Specifically, the shape of the convex portion C may include an arc-shaped convex portion, and the convex portion C is formed, for example, by metal stamping, but the present invention is not limited thereto. In addition, the thickness of the conductive elastic piece 1410 in this embodiment is about 0.1 mm to 0.3 mm, but other embodiments are not limited thereto.

Incidentally, the detection element 140 of this embodiment may further have a body 142. The body 142 is connected between the conductive elastic pieces 1410 and the detachable element 130. The convex portions C can be located at the ends of the conductive elastic pieces 1410 away from the body 142, so that the two conductive elastic pieces 1410 can be prevented from being separated from the opening H due to vibration or other non-detachable external force, thereby fixing the detection element 140 in the seat body 120 more firmly. In the prior art, some of the detachable elements 130 and the seat bodies 120 are electrically connected through a soft conductor. The aforementioned soft conductors include, for example, sponges mixed with conductive materials, and most of the aforementioned soft conductors have the characteristics of being easily deformed, so as to fit and be fixed in the seat body 120. However, the conventional soft conductors are prone to deformation protruding from the seat body 120, thereby pushing the detachable element 130 away from the seat body 120. As a result, a gap is likely to be formed between the detachable element 130 and the seat body 120, resulting in problems such as poor structure. In this embodiment, the detection element 140 has better rigidity, and the two conductive elastic pieces 1410 push against the seat body 120 in a direction away from each other and are fixed in the seat body 120; therefore, the detection element 140 can be prevented from applying an excessive normal thrust on the detachable element 130 in the seat body 120, thereby preventing the two conductive elastic pieces 1410 from pushing the detachable element 130 away from the seat body 120. Therefore, the detection element 140 of this embodiment can also prevent the occurrence of problems such as poor structure. It should be understood that in other embodiments, the number of the elastic conductive members 141 is not limited to two, and the specific structure of the elastic conductive member 141 is not limited to the conductive elastic piece 1410 shown in FIGS. 1 to 3.

The seat body 120 of this embodiment is, for example, fixed on the main circuit board 110 and is electrically connected to the main circuit board 110. Specifically, the seat body 120 can be fixed on the main circuit board 110 by means of welding and glue dispensing, but the present invention is not limited thereto. In this embodiment, the seat body 120 may have a side wall 122. The side wall 122 surrounds the opening H and has an inner wall surface 1220 (labeled in FIGS. 2 and 3). The inner wall surface 1220 is located in the opening H, and the conductive structure 121 can be disposed on all or part of the inner wall surface 1220 for the elastic conductive member 141 to be in electrical contact. Specifically, the conductive structure 121 of this embodiment can be disposed on all the inner wall surface 1220, so that the elastic conductive member 141 can more easily contact the conductive structure 121 when extending into the opening H. However, in another embodiment, the conductive structure 121 may be disposed on the part of the inner wall surface 1220 that contacts the elastic conductive member 141 to save material and reduce cost. In this embodiment, the conductive structure 121 includes, for example, a metal plating layer, wherein the aforementioned metal plating layer may include a tin plating layer, but the present invention is not limited thereto.

It can be understood that the specific configuration of the conductive structure 121 in this embodiment may depend on the structure of the elastic conductive member 141. For example, as mentioned above, the number of the elastic conductive members 141 of the detection element 140 can be two and the two elastic conductive members 141 are opposite to each other. The number of the inner wall surfaces 1220 of the side wall 122 may be two, and the two inner wall surfaces 1220 are disposed corresponding to the two elastic conductive members 141. The conductive structure 121 can be disposed on the two inner wall surfaces 1220 for the two elastic conductive members 141 to be in electrical contact.

It is to be noted that the seat body 120 may further has a detection circuit layer 123. The detection circuit layer 123 is disposed in the side wall 122 and surrounds the opening H. The detection circuit layer 123 is electrically connected to the main circuit board 110. Further, the main circuit board 110 can determine whether the detection circuit layer 123 is maintained in an electrically connected state, and can perform a corresponding action (e.g., generating the aforementioned warning signal) when it is determined that the detection circuit layer 123 is not electrically connected to the main circuit board 110. In this way, the electronic apparatus 100 can also prevent the detachable element 130 from being detached by destroying the side wall 122, thereby further improving the protection mechanism against detaching. Incidentally, the detection circuit layer 123 may be electrically connected to the main circuit board 110 via the conductive structure 121, but the invention is not limited thereto. In this embodiment, the side wall 122 can be made of a printed circuit board (PCB), and the wiring layer of the aforementioned printed circuit board can be used as the detection circuit layer 123, but the invention is not limited thereto.

Figure 4:
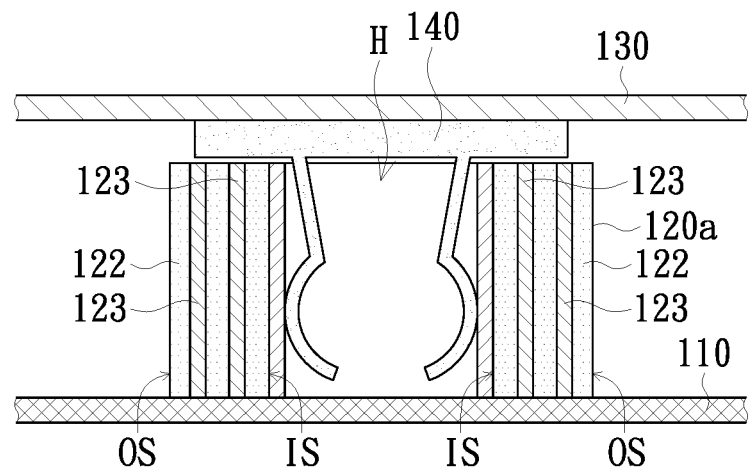
FIG. 4 is a schematic cross-sectional diagram of an electronic apparatus according to another embodiment of the present invention.

FIG. 4 is a schematic cross-sectional diagram of an electronic apparatus according to another embodiment of the present invention. Referring to FIG. 4, in this embodiment, the side wall 122 of the seat body 120a may have an inner side IS and an outer side OS. The inner side IS is located in the opening H and is opposite to the outer side OS, and the inner side IS and the outer side OS surround the opening H. In this embodiment, the inner side IS may include two inner wall surfaces 1220 on which the conductive structures 121 are disposed as shown in FIGS. 2 and 3. Referring to FIG. 4 again, the number of the detection circuit layers 123 is plural. The detection circuit layers 123 are disposed between the inner side IS and the outer side OS and overlap the inner side IS and the outer side OS. Therefore, the electronic apparatus 100a of this embodiment can further improve the protection mechanism against detaching. Incidentally, the side wall 122 may be made of a printed circuit board. Specifically, in one embodiment, the aforementioned printed circuit board may include a multi-layer circuit board, and a plurality of wiring layers of the multi-layer circuit board can be used as a plurality of detection circuit layers 123. In another embodiment, the aforementioned printed circuit board may include a plurality of single-layer circuit boards that overlap each other, and a plurality of wiring layers of the plurality of single-layer circuits may be used as a plurality of detection circuit layers 123, but the present invention is not limited thereto.

Compared with the prior art, the electronic apparatus 100 of this embodiment adopts the detection element 140 and the seat body 120, wherein a detachable element 130 is disposed on the detection element 140. When assembling the electronic apparatus 100, the elastic conductive member 141 is inserted into the opening H of the seat body 120, and the elastic conductive member 141 is electrically contacted with the conductive structure 121 in the opening H, so as to complete the installation of the detachable element 130. On the other hand, when the elastic conductive member 141 is detached from the seat body 120, the main circuit board 110 can determine that the detachable element 130 is detached accordingly. Therefore, the electronic apparatus 100 of this embodiment can not only detect that the detachable element 130 is detached, but also has the advantages of simple structure and easy assembly.

Figure 5:
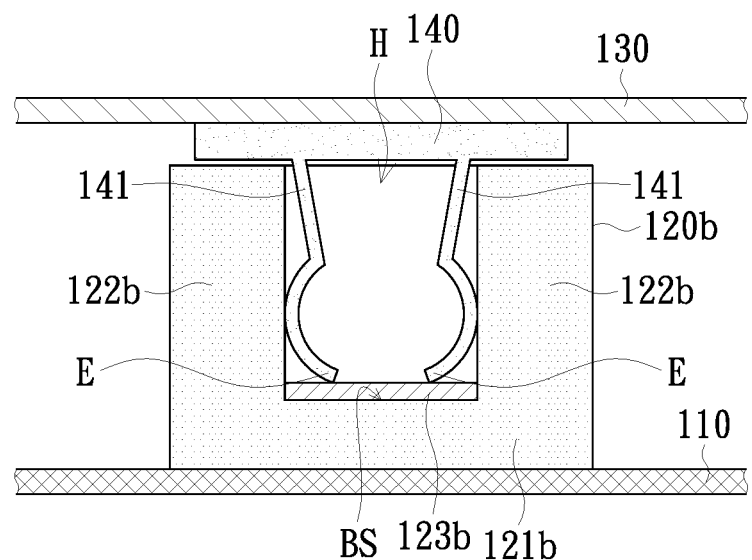
FIG. 5 is a schematic cross-sectional diagram of an electronic apparatus according to another embodiment of the present invention.

FIG. 5 is a schematic cross-sectional diagram of an electronic apparatus according to another embodiment of the present invention. Referring to FIG. 5, the seat body 120*b* may further have a base 121*b*, and the side wall 122*b* stands on the seat body 120*b* and surrounds the opening H. The base 121*b* has a bottom surface BS located in the opening H, and the conductive structure 123*b* is disposed on the bottom surface BS. Furthermore, the end E of the elastic conductive member 141 is separated from the conductive structure 123*b* once the detection element 140 is slightly pulled out from the opening H. Therefore, the electronic apparatus 100*b* of this embodiment can further enhance the sensitivity of the protection mechanism against detaching.

In summary, the electronic apparatus of the present invention adopts the detection element and the seat body, wherein a detachable element is disposed on the detection element. When assembling the electronic apparatus, the elastic conductive member is inserted into the opening of the seat body, and the elastic conductive member is electrically contacted with the conductive structure in the opening, so as to complete the installation of the detachable element. On the other hand, when the elastic conductive member is detached from the seat body, the main circuit board can determine that the detachable element is detached accordingly. Therefore, the electronic apparatus of the present invention can not only detect that the detachable element is detached, but also has the advantages of simple structure and easy assembly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic apparatus, comprising:
   a main circuit board;
   a seat body, disposed on the main circuit board and comprising an opening and a conductive structure located in the opening;
   a detachable element; and
   a detection element, disposed on the detachable element and comprising an elastic conductive member, wherein the elastic conductive member is adapted to extend into the opening, apply an elastic force to the seat body in the opening, and electrically contact the conductive structure, the main circuit board is adapted to determine that the seat body and the detection element are in a first state or a second state, the first state comprises that the elastic conductive member electrically contacts the conductive structure, and the second state comprises that the elastic conductive member is separated from the conductive structure.

2. The electronic apparatus according to claim 1, wherein a number of the elastic conductive members of the detection element is two, and the two elastic conductive members are opposite to each other.

3. The electronic apparatus according to claim 2, wherein the two elastic conductive pieces each comprise a conductive elastic piece, the two conductive elastic pieces each have a convex portion, wherein when the two conductive elastic pieces extend into the opening, the two convex portions are adapted to press against the seat body in the opening, and the convex portion is adapted to electrically contact the conductive structure.

4. The electronic apparatus according to claim 3, wherein the convex portion is formed by bending the conductive elastic piece.

5. The electronic apparatus according to claim 4, wherein the detection element further has a body connected between the conductive elastic piece and the detachable element, and the convex portion is located at an end of the conductive elastic piece away from the body.

6. The electronic apparatus according to claim 1, wherein the seat body has a side wall, the side wall surrounds the opening and has an inner wall surface, the inner wall surface is located in the opening, and the conductive structure is disposed on all or part of the inner wall surface.

7. The electronic apparatus according to claim 6, wherein a number of the elastic conductive members of the detection element is two, the two elastic conductive members are opposite to each other, a number of the inner wall surfaces of the side wall is two, the two inner wall surfaces are disposed to correspond to the two elastic conductive members, and the conductive structure is disposed on the two inner wall surfaces.

8. The electronic apparatus according to claim 1, wherein the seat body has a base and a side wall, the side wall stands on the base and surrounds the opening, the base has a bottom surface located in the opening, and the conductive structure is disposed on the bottom surface.

9. The electronic apparatus according to claim 1, wherein the seat body further has a side wall and a detection circuit layer, the side wall surrounds the opening, the detection circuit layer is disposed in the side wall and surrounds the opening, and the detection circuit layer is electrically connected to the main circuit board.

10. The electronic apparatus according to claim 9, wherein the side wall has an inner side and an outer side, the inner side is located in the opening and is opposite to the outer side, the inner side and the outer side surround the opening, a number of the detection circuit layers is plural, and the detection circuit layers are disposed between the inner side and the outer side and overlap the inner side and the outer side.

11. The electronic apparatus according to claim 9, wherein the detection circuit layer is electrically connected to the main circuit board via the conductive structure.

12. The electronic apparatus according to claim 9, wherein the side wall comprises a printed circuit board, and a wiring layer of the printed circuit board is the detection circuit layer.

13. The electronic apparatus according to claim 12, wherein the printed circuit board comprises a multi-layer circuit board, the number of the detection circuit layers is plural, and wiring layers of the multi-layer circuit board are the detection circuit layers.

14. The electronic apparatus according to claim 13, wherein the printed circuit board comprises a plurality of single-layer circuit boards that overlap each other, the number of the detection circuit layers is plural, and wiring layers of the single-layer circuit boards are the detection circuit layers.

15. The electronic apparatus according to claim 1, wherein the two conductive structures each comprise a metal plating layer.

16. The electronic apparatus according to claim 1, wherein the detection element further comprises a conductive layer disposed on the elastic conductive member, and an electrical conductivity of the conductive layer is greater than an electrical conductivity of the elastic conductive member.

17. The electronic apparatus according to claim 16, wherein a material of the elastic conductive member comprises copper alloy, and a material of the conductive layer comprises gold.

18. The electronic apparatus according to claim 1, wherein the seat body is fixed on the main circuit board and is electrically connected to the main circuit board.

* * * * *